C. T. REED & T. WILLIAMS.
CONSTRUCTION OF CHURN MOTORS.
No. 182,474.　　　　　　　　　　Patented Sept. 19, 1876.
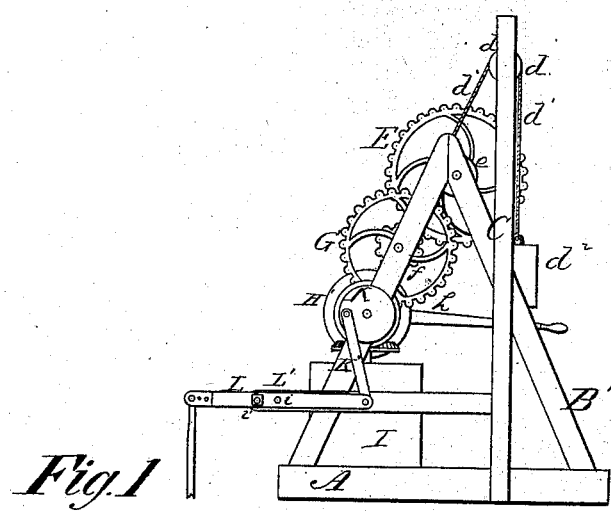
Fig. 1
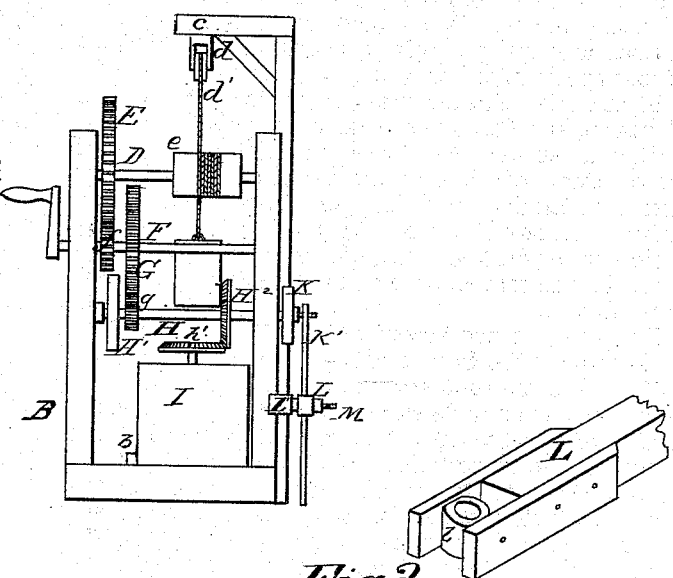
Fig. 2
Fig. 3

UNITED STATES PATENT OFFICE.

CALVIN T. REED, OF EDENBURG, AND THOMAS WILLIAMS, OF NEWCASTLE, PENNSYLVANIA.

IMPROVEMENT IN THE CONSTRUCTION OF CHURN MOTORS.

Specification forming part of Letters Patent No. 182,474, dated September 19, 1876; application filed August 21, 1876.

*To all whom it may concern:*

Be it known that we, C. T. REED, of Edenburg, and THOMAS WILLIAMS, of Newcastle, in the county of Lawrence and State of Pennsylvania, have invented certain new and useful Improvements in the Construction of Churn Motors; and we do hereby declare the following to be a full, clear, and exact description of the invention, such as will enable others skilled in the art to which it pertains to make and use it, reference being had to the accompanying drawings, which form part of this specification, in which—

Figure 1 is a side elevation, Fig. 2 is a front elevation, and Fig. 3 is a perspective detail.

This invention has relation to automatic churns; and consists in the novel construction, combination, and arrangement of mechanism, whereby either a rotary or vertically-reciprocating dasher, or both, may be operated from the one source, as hereinafter described and claimed.

Referring to the accompanying drawings, A designates the base, and B B' the upright sides of the churn-motor frame. C is an upright post, on one side supporting, from a projecting arm, $c$, on top, a pulley, $d$, over which passes a rope or cord, $d^1$, holding a weight, $d^2$. This rope or cord is wound upon a windlass-drum, $e$, which has a horizontal shaft, D, near the top of the motor-frame, supporting a large gear-wheel, E. F is a horizontal shaft lower down, holding a pinion, $f$, which engages with wheel E, and a large toothed wheel, G, which, in turn, engages with a pinion, $g$, on a third horizontal shaft, H. The shaft H holds also a fly-wheel, $H^1$, and a beveled gear-wheel, $H^2$, and is journaled at one end to a lever, $h$, by moving which the wheels G and $g$ are thrown in and out of gear. When the cord is wound upon the drum the descent of the weight imparts motion through the first shaft and gearing to the others, from the last of which it is communicated to the churn or churns. The cord is wound by applying a key to the squared end of the shaft F. I designates a churn, having a vertical rotary dasher, and situated between the sides B B', and below the shaft H. The base A has ways or guides $b$, between which the churn slides, allowing it to be readily removed and replaced.

The churn may be of any suitable construction. Upon the upper end of its beater-shaft is arranged a beveled gear-wheel, $h'$, engaging with and receiving motion from the wheel $H^2$. Upon one end of the shaft F is arranged a crank or crank-wheel, K, which connects, by a pitman, K', with a rock-shaft, L, fulcrumed to a projecting beam, L', of the frame. The function of this rock-shaft is to impart vertical reciprocating motion to the dasher of an old-style churn. The rock-shaft is adjustable at its fulcrum to regulate the stroke. Its forward end is forked or recessed, and holds a pivoted sleeve or collar, $l$, which receives the dasher-shaft, and compensates for the rocking motion of the shaft.

For the purposes of adjustment the rock-shaft and projecting beam are provided with several holes $i\ i$ to hold, at different points, the fulcrum-shaft M. The rock-shaft is removable at pleasure.

The merits of this motor may be easily perceived and appreciated. It is simple, durable, and cheap. Being adapted to the operating of churns of different kinds, its full power may be utilized. The purchase of several expensive rotary churns is not necessary. One of the simplest of the class may be obtained, and the extra power used effectively in operating the ordinary dasher-churn, with which every farmer is already supplied. When the use of the old-style churn is not required the rock-shaft is an excellent means of communicating power to operate a pump. The same motor may at times be used to operate a washing-machine, or to drive other light machinery; and even while the rock-shaft is at work operating a churn-dasher, other work may be accomplished through the bevel gearing.

Having described our invention, we claim as new and desire to secure by Letters Patent—

The improved churn-motor, for imparting rotary and vertically-reciprocating motion to churns of different kinds, consisting, essentially, of the frame B B', horizontal shafts D F H, gearing E $f$ G $g$, drum $e$, cord $d^1$, pulley $d$, bevel gearing H² $h'$, crank K, pitman K', and rock-shaft L, all combined and arranged substantially as described and shown.

In testimony that we claim the foregoing we have hereunto set our hands this 12th day of August, 1876.

CALVIN THOMPSON REED.
THOMAS WILLIAMS.

Witnesses:
J. R. RICHARDSON,
THOMAS MCBRIDE.